May 4, 1943.    F. A. ROJAS    2,318,184
LAMINATED SHEET AND METHOD OF PRODUCING SAME
Original Filed Jan. 18, 1936
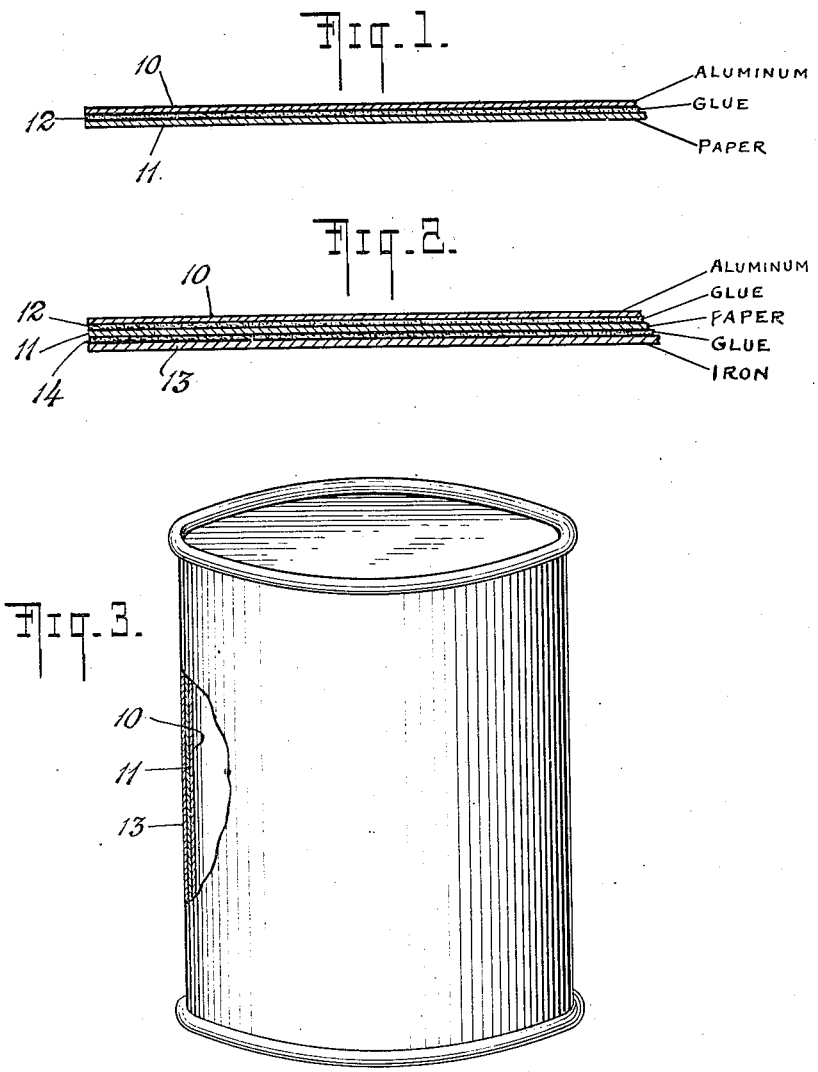
WITNESS
G. V. Rasmussen
INVENTOR
F. A. ROJAS
BY
ATTORNEYS Patented May 4, 1943

2,318,184

UNITED STATES PATENT OFFICE 2,318,184

LAMINATED SHEET AND METHOD OF PRODUCING SAME

Floricel A. Rojas, New York, N. Y., assignor of one-half to Walter H. Liebman, New York, N. Y.

Application January 18, 1936, Serial No. 59,681
Renewed April 3, 1940

12 Claims. (Cl. 154—40)

The present invention relates to an improvement in the method of uniting sheets of metal, and particularly of aluminum, with a sheet of fibrous or cellulosic material such as paper, cardboard, wood or substantially pure cellulose, and to the laminated structure so obtained and shaped articles made of such laminated structure.

Cardboard to which a sheet of aluminum is cemented by means of sodium silicate is known. However, the adhesion between the two sheets is a comparatively weak one, inadequate for many purposes for which an aluminum-cardboard aggregate could be used, for instance cylindrical containers for preserved food or for beverages. It is the object of my invention to create a bond between, for example, a sheet of aluminum, such as aluminum foil, and cardboard or other cellulosic material, sufficiently strong to enable the aggregate to withstand strains to which it would be subjected when machined or shaped, for instance by bending into cylindrical form or drawing it into the form of vessels or articles such as dished plates.

My invention may be employed with cellulosic material and the aluminum sheet each of any desired thickness. I may firmly attach by my method a very thin foil of aluminum to a heavy cardboard, or a comparatively thick plate of aluminum to a comparatively thin piece of paper. For practical purposes, however, when foil of aluminum is used, this should have a thickness of at least $\frac{1}{1000}$ of an inch in order that it may be strong enough to withstand bending, drawing or other shaping strains even though it may have practically no tensile or compressive strength in its own plane, or any substantial degree of rigidity.

In accordance with the present invention, the aluminum sheet or foil is connected with the cellulosic sheet by way of a glue or cement which may or may not be chemically reactive toward the aluminum surface, and such surface is suitably prepared by bringing it into an active condition in which it will unit with the glue and form a continuous and strongly coherent connection with the other sheet. The success of the process depends to a large extent, if not entirely, upon a proper preparation of the aluminum surface. Ordinary aluminum which has been exposed to the air and has thus acquired a superficial coating of oxide has been found by me to be generally unsuitable for use in such condition for making laminated sheets which are to be subjected to bending, drawing and similar strains. The reasons for this, I have found, are that the surface is usually covered with dust and grease and contains also occluded gases, all of which are inimical to a satisfactory connection with a sheet of non-metallic material, and that the oxide is in a passive condition and will not react with or physically unit with the cement and thus form an intimate and continuous bond therewith.

The initial treatment accordingly is designed to place the aluminum surface in a clean and active condition in which a firm and continuous bond with the cement is promoted. When the aluminum surface has been properly prepared, the composite or laminated material can be bent back and forth a large number of times without showing any evidence of separation between the metal and the paper, the product acting, to all intents and purposes, as a unitary sheet.

The preliminary preparation of the aluminum thus has for its object to obtain a sheet or foil having an active surface which will readily unit, either physically or chemically or both with the cement to form a continuous and strong connection.

According to one form of the invention, the sheet aluminum may be exposed to the action of oxidizing agents which produce a surface coating of active oxide. It is important that the oxidizing agents produce a coating of oxide which is in the active and not in the passive condition, as a passive oxide will not readily react or unit with the cement or glue and so cannot be relied upon to produce the desired strong and continuous bond. Thus, aluminum sheets may be heated in the air or in an atmosphere of oxygen or in water until a coating of active oxide is obtained. At the same time, greasy matter is volatilized or carbonized and occluded gases are expelled. The aluminum should not, however, be heated until a high degree of iridescence appears, as the oxide is then in the passive condition in which it will not readily unit with the cement or glue. The metal sheet may also be subjected for a very short period of time—say, a few seconds—to an oxidizing solution to produce thereon an active coating of oxide. Care should be taken to prevent over-oxidation as an excessive coating of oxide weakens the bond with the cement glue.

The preliminary treatment of the aluminum foil or sheet in accordance with a second mode of carrying out the invention comprises subjecting the aluminum to the action of the electric current in an electrolytic bath, the sheets being made either the anode or the cathode. The electrolyte is preferably a basic material such as sodium hydroxide. When the aluminum is made the anode it is subjected to anodic oxidation and in a few seconds an active coating of oxide can be obtained. During this treatment any grease on the surface of the aluminum is effectively removed. When the aluminum forms the cathode of the bath, no oxidation takes place but it is thoroughly degreased and its surface is apparently activated for it then makes a more satisfactory bond with the cellulosic material than does untreated aluminum.

According to a still further embodiment of the invention, aluminum sheets are employed which already have the usual oxide coating, which aluminum gradually forms in air. These commercial sheets are subjected to the action of hot water for several minutes, but better results are obtained with a hot solution of a salt or other compound such as a not strongly corroding basic or acid compound, which acts to degrease the surface and also to free it of occluded gases which appear to make it passive. The aluminum may be washed, either before or after the heating, to remove dirt and greasy matter. It is probable that the action of the salt or other compound on the aluminum surface is not purely physical but also to some degree chemical. The treatment should be continued until the bubbles which cling to the surface of the aluminum disappear. In this way a surface which cannot be wetted is so changed that it wets easily and uniformly.

Among the compounds that may be employed in the preliminary treatment of the aluminum are sodium sulfate, sodium acid sulfate, sodium carbonate, aluminum sulfate, ammonium sulfate, barium hydroxide, boric acid, ferric sulfate, magnesium sulfate, sodium chloride and aluminum acetate, and in general any compound which will not act excessively corrosively upon aluminum. Good results have been obtained with sodium sulfate, while sodium chloride and aluminum acetate are not quite as satisfactory, although considerable improvement over non-treated aluminum can be noted. By the action of these compounds, particularly in hot or boiling solution, the occluded gases, dirt and grease are removed and the surface is converted from the passive into the active condition. The dissolved compound appears to hasten the expulsion of the occluded gases and may also have some superficial chemical effect. Ordinarily about a three-minute treatment will be satisfactory. Overtreatment should, however, be avoided, as this usually results in the production of a passive oxide which does not react or unite readily with the glue. In any event, care should be taken to avoid the deposition of loosely adhering salts or oxides upon the surface of the sheet and it is important that the pores or pits on the surface of the aluminum be not clogged. Sodium silicate of 5–10° Bé. may also be used, and in fact gives very satisfactory results.

In the electrolytic pre-treatment, I may make the aluminum the anode in a suitable electrolytic bath, using as the electrolyte a solution of sodium hydroxide of approximate concentration of 5%. The radicals of acids which attack aluminum, for instance, the sulfate and hydrochloride radicals, should not be present in the bath as the free acids are formed at the anode and will dissolve the aluminum. Where such radicals are present, it is advisable to add a suitable compound which will precipitate them; thus, when the bath contains sulfates, barium carbonate or strontium carbonate may be added to remove the sulfate ion. The anodic method has also the advantage of freeing the aluminum from grease and other impurities.

When the aluminum is made the cathode, the oxide film which is present on commercial aluminum is reduced to a greater or less extent. However, any grease which may be present on the commercial aluminum is removed by the saponification action of the sodium hydroxide and at the same time the hydroxide will remove the oxide present and even attack the aluminum, so that the latter will present an absolutely clean surface, more or less free of oxide depending upon the time of treatment, but "pitted" or "etched" in a manner to provide innumerable points of interlock with a dried cement. After the aluminum has been removed from the electrolyte it is rinsed in clean water and is then ready for glueing to the cellulosic or fibrous sheet.

With a sodium hydroxide electrolyte, the following reactions probably occur at the cathode in the cathodic treatment:

$$Al + 3Na^+ + 3H_2O \rightarrow Na_3AlO_3 + 3H_2$$
$$Al_2O_3 + 3H_2 \rightarrow 2Al + 3H_2O$$
$$4Al + 2Na^+ + 8H_2O \rightarrow 2Al_2O_3 + 2NaOH + 7H_2$$
$$Al_2O_3 + 12NaOH \rightarrow 4Na_3AlO_3 + 6H_2O$$

The hydrogen that is formed collects in innumerable bubbles which partially protect the aluminum surface against further chemical action. The electrolyte and the freshly formed sodium hydroxide and nascent sodium can, however, attack the aluminum and its oxide at innumerable points between the individual hydrogen bubbles and there results an aluminum sheet having minute craters and pits which provide points of interlocking engagement with the glue. Some of the $Al_2O_3$ that is formed appears to cling to the pure aluminum surface.

During the anodic treatment the following reactions probably take place at the anode:

$$4OH^- \rightarrow 2H_2O + O_2$$
$$4Al + 3O_2 \rightarrow 2Al_2O_3$$
$$6NaOH + Al_2O_3 \rightarrow 2Na_3AlO_3 + 3H_2O$$

The reactions at both the anode and cathode thus yield both sodium aluminate and aluminum oxide.

The treatment should be stopped before an iridescent coating of passive oxide is produced. I have found 15 seconds at the anode to give satisfactory results with a sodium hydroxide electrolyte. The current density should be about 5 amperes per square foot.

By these electrolytic treatments the surface of the aluminum is activated and is put into a condition in which a glue, such as sodium silicate, which may have a chemical action on the aluminum, will be firmly and continuously anchored thereon. After the aluminum has been removed from the electrolyte it is rinsed in clean water and is then ready for glueing to the cellulosic or fibrous sheet.

Best results in the subsequent cementing step are obtained with a relatively rough surface composed of innumerable pits or craters, and it appears that upon removal of gases, dirt and grease, by, for example, the anodic oxidation, the surface is so modified that union between the silicate glue and the metal occurs along the various ridges and crevices and a strong interlocking bond is attained thereat. In fact, this preliminary treatment improves the bond that can be attained also with other types of glue, such as fish glue, but better results are secured with a sodium silicate glue, perhaps because of chemical reaction with the glue.

The aluminum sheet, having been prepared in one of the ways above described, is then coated with a suitable glue or cement. I have found sodium silicate to be a highly satisfactory adhesive for my purposes. The silicate, preferably in the 40° Bé. solution in which it is sold commercially, is accordingly applied to the cellulosic and metal sheets, or to only one of the sheets, and the two sheets then placed one on the other with the treated side of the aluminum in contact with the silicate. A gentle pressure is then exerted upon the aggregate so as to insure continuous contact of the sodium silicate both with the cellulosic sheet or cardboard and with the aluminum sheet. The aggregate is then submitted to a gentle heat of approximately 120–130° F. for a period of from 15 minutes to an hour, 15 minutes being usually sufficient to bring about a strong bond between the two sheets. This bond is very probably promoted by a chemical reaction between the sodium silicate and the aluminum oxide, or between the aluminum and the sodium hydroxide resulting from the hydrolysis of the silicate, or between the aluminum and its oxide with the silicic acid. When the process has been completed, the aluminum and cellulosic product will adhere so tenaciously that it is difficult, if not impossible, to strip the one from the other, as can be done when sodium silicate is used as an adhesive without preliminary preparation of the aluminum and without subsequent heat treatment.

It is my theory, although I do not wish to be understood as being committed thereto, that on the application of heat the sodium silicate reacts with the active aluminum oxide to form sodium aluminate. The resulting removal of the oxide leaves the surface of the aluminum roughened or "etched" and thus brings about a close adhesion between the sodium silicate and the aluminum. It is, however, possible that the sodium aluminate adheres more tenaciously to the aluminum than does sodium silicate.

Care should be taken not to use too much of the sodium silicate so as not to space the aluminum and the cellulosic product too far apart, as otherwise the joint would be no stronger than the layer of excess sodium silicate. Care should also be taken not to have the temperature of the heat treatment too high as otherwise the sodium silicate would effloresce and this would affect the adhesion very adversely. A temperature as high as 212° F. would therefore decidedly be contraindicated. With shorter periods of heating, higher temperatures than 130° F. may be employed, but, in general, temperatures should be avoided at which silicic acid is dehydrated.

The silica precipitated as the result of the reaction between the sodium silicate and the aluminum oxide by penetrating both the cellulosic sheet and the rough or "etched" portions of the aluminum tends to create a firmer joint and the silica, moreover, has the advantage of acting as an electric insulator and serves to make the backing of the aluminum a better electrical insulator.

By the processes described herein, there may thus be obtained a composite sheet of aluminum and, for example, cardboard, or of aluminum joined with a sheet of another metal such as iron, through an intermediate layer of cellulosic material, wherein the bond is so uniform and continuous that the laminated sheet can be subjected to various shaping operations without danger of separating the individual sheets of which it is composed. Dished and other shaped articles such as cans for receiving preserved foods or beverages, picnic plates, etc. can thus be made of the composite sheet by suitable shaping operations, the composite sheet acting very much as if it were an integral single layer sheet.

I have found that a glue composed of pyroxylin or cellulose nitrate will not adhere to ordinary aluminum, but will cling tenaciously to aluminum that has been treated in one of the ways above described. This fact appears to be due not merely to the removal of any surface grease or dirt, but also to the expulsion of occluded gases.

Products made in accordance with the invention are illustrated by way of example on the accompanying drawing. In said drawing, Fig. 1 shows an enlarged section through a laminated sheet made up of aluminum and cellulosic material; Fig. 2 shows a laminated structure having a sheet of aluminum at one side and a sheet of iron or other metal upon the other which are joined together through an intermediate sheet of cellulosic material; and Fig. 3 shows a can adapted to receive preserved foods or beverages and made up of a laminated sheet made in accordance with the invention.

In Fig. 1, the numeral 10 indicates a sheet of aluminum, while the cellulosic or fibrous sheet is indicated at 11. As already stated, these two sheets may be made of any desired thickness, either the aluminum sheet or the cellulosic sheet being the thicker, depending upon the uses for which the composite sheet is to be employed. The aluminum, or at least the surface thereof facing the cellulosic sheet 11, is activated in accordance with one of the procedures above described and the intermediate layer of glue, such as sodium silicate, is interposed between the two sheets in and desired manner. The cemented sheets are subjected to a temperature of about 120–130° F. under pressure and when dried represent a strongly coherent structure whose sheets cannot be stripped one from the other along the layer of cement.

The glue should be kept long enough in contact with the aluminum to permit whatever reaction takes place therebetween to occur. Usually about 15 minutes at about 130° F. will suffice, but shorter periods at somewhat higher temperatures may be employed. The heating should not be at too high a temperature; in general, as already mentioned, the dehydration point of the silicic acid should not be exceeded or even approximated.

Fig. 2 shows a sheet in which an aluminum sheet 10 is cemented to a cellulosic sheet 11 in any of the ways above described, the sheet 11 being cemented in any suitable manner to a sheet 13 of iron or other metal. The iron may or may not be activated in the manner described herein and may be joined to the sheet 11, by a layer of cement 14 which may be sodium silicate or any other suitable material.

In Fig. 3 is shown a container which is made up of the sheet shown in Fig. 2. As shown, the aluminum surface 10 is on the inside of the container while the iron or steel or other metal surface 13 is upon the outside thereof. In view of the much higher cost of tin as compared with aluminum, a can made as shown in Fig. 3 can be manufactured much more cheaply than tin-coated all-metal cans. The intermediate layer of paper not only serves to join the aluminum sheet to the iron sheet but gives body and rigidity to the structure, while the external iron or steel sheet presents a neat and clean appearance.

The pressing of the composited sheets can be accomplished in any suitable manner, as by means of rollers, which may be heated by steam or electrically. The heating may, however, be carried out before or after the pressing.

I may thus obtain containers for edibles which are odorless, do not impart any taste to the contents, and are non-poisonous; also, they are light in weight but yet have great mechanical strength.

Moreover, as only a single metal is exposed to the contents of the container, no local electrolytic action with its resulting contamination of the food or beverages can occur.

Instead of coating the aluminum with the moist glue and then applying the cellulosic or fibrous sheet, the laminated structure thereupon being subjected to heat and pressure, I may first apply a thin coating of glue to the aluminum sheet (and also the cellulosic sheet separately) and then dry the glue thereon. In this way a firm bond may be established between the layer of glue and the aluminum sheet and if desired also the cellulosic sheet separately. The hardened glue may then be superficially moistened and the two sheets brought together with the layers of glue in contact (when both sheets have been glued), such two layers readily fusing into each other. In such case it may not be necessary to heat, although I prefer to subject the assembled structure to a temperature of about 120° F., whether or not the layers of glue were originally dried by heat on the separate aluminum and cellulosic sheets. This procedure insures proper action of the glue on the aluminum, and also an adequate layer of glue, as a fresh layer of glue would tend to be squeezed out under pressure.

While in the preferred form of the invention a comparatively thin sheet of aluminum, as little as one-thousandth of an inch in thickness, is connected to a relatively thick sheet of cellulosic material, it is within the scope of the invention to connect a relatively thin sheet of cellulosic material to a thick sheet of aluminum or to use sheets of substantially equal thickness, as illustrated. Where the aluminum sheet is a foil, i. e. very thin, it will of course contribute practically nothing to the compressive or tensile strength of a shaped article, the strength of the article being in such case due to the cellulosic layer and/or any metal sheet that may be cemented to the other side of the cellulosic sheet. In view of the continuous and firm bond between the cellulosic and metal sheets obtained in accordance with the invention, my improved procedure may be employed in the coloring or printing of aluminum surfaces with substances which will not adhere to aluminum, but will adhereto, for example, paper. Thus a sheet of aluminum may be provided with a firmly adhering thin coating of paper which may be then printed or painted with any composition that will adhere to paper.

It will be appreciated that the tenacious and continuous bond which I secure between aluminum and paper makes it possible to "plate" aluminum onto other metals or surfaces by way of the intermediate layer of paper, wood or other material. Also, the paper side of a paper coated aluminum sheet (the paper being attached to the aluminum by means of a water-insoluble cement) can be electroplated with a metal which will not readily plate on aluminum. The paper-coated aluminum can also be cemented to a plastic or non-metallic material such as Bakelite or Celluloid by way of the paper.

I desire to call attention to the fact that claims to a shaped article formed of a laminated sheet comprising a pre-treated sheet of aluminum secured to a sheet of cellulosic material by way of a sodium silicate bond, are, among others, presented in my continuation-in-part application Serial No. 120,697, filed January 15, 1937, now Patent No. 2,285,053.

I claim:

1. The method of connecting sheet aluminum with a sheet of cellulosic material which comprises subjecting the aluminum as an anode and at a current density of about five amperes per square foot to the action of an electric current in an electrolytic bath having an alkali metal hydroxide solution as electrolyte until adhering grease is removed and an active oxide coating is formed on the surface of said sheet aluminum, applying to the aluminum a coating of sodium silicate cement, applying a cellulosic sheet directly to the moist silicate coated surface, and drying the laminated structure at an elevated temperature but below the dehydration point of silicic acid, and under pressure.

2. A method as set forth in claim 1 wherein the drying of the laminated structure is effected at a temperature of the order of 120°–130° F.

3. A method as set forth in claim 1 wherein the cellulosic sheet is a sheet of paper.

4. A shaped article formed by mechanically working a flexible, laminated material comprising a sheet of aluminum united to a sheet of cellulosic material by way of a layer of sodium silicate which has reacted chemically with the surface of the aluminum sheet, the bond between said sheets being substantially continuous in spite of the shaping operation.

5. A shaped article formed by mechanically working a flexible, laminated material comprising a sheet of aluminum foil united to a considerably thicker sheet of cellulosic material by way of a layer of sodium silicate which has reacted chemically with the surface of the aluminum sheet, the bond between said sheets being substantially continuous in spite of the shaping operation.

6. A dished article formed by die-shaping a flexible, flat, laminated material composed of a thin sheet of aluminum united to a backing of flexible, cellulosic material through an intermediate layer of sodium silicate which has reacted chemically with the surface of the aluminum sheet, the bond between said sheets being substantially continuous in spite of the shaping operation.

7. A flexible, laminated structure comprising a sheet of aluminum having an electrolytically corroded surface and cemented at such surface to a sheet of cellulosic material by an intermediate layer of sodium silicate which has reacted chemically with the surface of the aluminum sheet, said laminated structure being capable of withstanding shaping operations without any substantial separation between the aluminum and cellulosic sheets.

8. A flexible, laminated structure comprising a sheet of aluminum having a cathodically corroded surface and cemented at such surface to a sheet of cellulosic material by an intermediate layer of sodium silicate which has reacted chemically with the surface of the aluminum sheet, said laminated structure being capable of withstanding shaping operations without any substantial separation between the aluminum and cellulosic sheets.

9. A flexible, laminated structure comprising an anodically corroded sheet of aluminum of such thinness as to have substantially no compressive strength, cemented to a sheet of cellulosic material of considerably greater thickness through an intermediate layer of sodium silicate which has reacted chemically with the surface of the aluminum sheet, said laminated structure being capable of withstanding shaping operations without any substantial separation between the aluminum and cellulosic sheets.

10. A flexible, laminated structure comprising an anodically corroded sheet of aluminum cemented directly to a sheet of cellulosic material through an intermediate layer of sodium silicate adhering to both the aluminum and cellulosic surfaces, said sodium silicate layer being chemically reacted with the surface of the aluminum sheet, said laminated structure being capable of withstanding shaping operations without any substantial separation between the aluminum and cellulosic sheets.

11. The method of producing an aluminum-surfaced article having a backing of fibrous material which comprises subjecting a sheet of aluminum to oxidizing conditions in a non-plating electrolytic bath until adhering grease is removed and the surface is corroded to an activated condition for union with a sodium silicate cement, applying a layer of sodium silicate cement between the corroded aluminum surface and the sheet of fibrous material, said layer being in direct contact with both said sheets, subjecting the joined layers to heat and pressure while the sodium silicate layer is moist until a continuous connection between the aluminum and the fibrous material is obtained, said sodium silicate layer being chemically reacted with the surface of the aluminum sheet, and then subjecting the laminated sheet to a shaping operation.

12. The method of producing an aluminum-surfaced article having a packing of fibrous material which comprises causing the aluminum sheet to act as an electrode for a short period of time in a non-plating electrolytic bath, until adhering grease is removed and the surface is corroded to an activated condition for union with a sodium silicate cement, applying a layer of sodium silicate cement between the corroded aluminum surface and the sheet of fibrous material, said layer being in direct contact with both said sheets, and subjecting the joined layers to heat and pressure while the sodium silicate layer is moist until a continuous connection between the aluminum and the fibrous material is obtained, said sodium silicate layer being chemically reacted with the surface of the aluminum sheet.

FLORICEL A. ROJAS.